United States Patent [19]

Remy

[11] 3,868,463

[45] Feb. 25, 1975

[54] METHOD OF TREATING ARRHYTHMIA

[76] Inventor: David C. Remy, 607 Jenkins Ln., North Wales, Pa. 19454

[22] Filed: Feb. 26, 1973

[21] Appl. No.: 335,632

Related U.S. Application Data

[63] Continuation-in-part of Ser. No. 786,763, Dec. 24, 1968, abandoned.

[52] U.S. Cl. ............................................. 424/330
[51] Int. Cl. ............................................ A61k 27/00
[58] Field of Search .................................. 424/330

[56] References Cited
OTHER PUBLICATIONS

Chem. Abst. 8th Collective Index Vol. 66-75 (1967-1971) page 98455.

*Primary Examiner*—Sam Rosen
*Attorney, Agent, or Firm*—Harry E. Westlake, Jr.; Daniel T. Szura

[57] ABSTRACT

This invention relates to a method of treating or preventing cardic arrhythmias by administering to the affected patient a safe but effective amount of a dibenzocycloheptene compound having an aminomethyl and a 5-hydroxy substituent at the 5- position. These compounds are prepared by treatment of dibenzocyclohepten-5-ones with dimethylsulfonium methylide or dimethylsulfoxonium methylide to produce an intermediate spiroepoxide compound which is subsequently reacted with ammonia or a lower aliphatic primary or secondary amine to produce a 5-hydroxy-5-aminomethyl-5H-dibenzo[a,d]cycloheptene or an N-alkyl derivative of such a compound. These 5-hydroxy-5-aminomethyl-5H-dibenzo[a,d]cycloheptenes have antiarrhythmic activity and can be used to overcome or prevent cardiac irregularities.

8 Claims, No Drawings

METHOD OF TREATING ARRHYTHMIA

This application is a continuation-in-part of copending application Ser. No. 786,763, filed Dec. 24, 1968 now abandoned.

DESCRIPTION

This invention relates to a method of treating or preventing arrhythmia in animals by administration of novel 5-hydroxy-5-aminomethyl dibenzocycloheptene compounds.

More particularly, the invention relates to a method for preventing or modifying existing cardiac arrhythmias by administration to the affected animal of a safe but effective amount of a derivative in which one or more of the hydrogens of the dibenzocycloheptene nucleus are replaced by another substituent.

In accordance with the present invention, cardiac arrhythmias are prevented or modified in animals, especially mammals, for example horses, dogs and cattle, or man, by the oral or parenteral administration of an effective and non-toxic amount of a compound having the formula

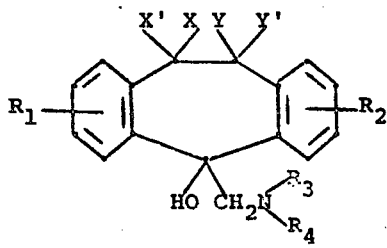

wherein
X and Y together represent either
1. an additional carbon-to-carbon double bond, in which case X' is hydrogen and Y' represents a substituent selected from the group consisting of hydrogen, halogen, especially chlorine, bromine and fluorine, and a loweralkyl substituent; or
2. X and Y together represent a methylene substituent and X' and Y' are each hydrogen; or
3. X, X', Y and Y' each represent hydrogen;

$R_1$ and $R_2$ are each a member selected from the group consisting of hydrogen, loweralkyl, halo (particularly chlorine, bromine or fluorine), trifluoromethyl, alkoxy, and a loweralkylsulfonyl; and $R_3$ and $R_4$ are each a member selected from the group consisting of hydrogen and loweralkyl and their non-toxic pharmacologically acceptable acid addition salts.

Among the non-toxic pharmacologically acceptable acid addition salts included within the scope of our invention are the compounds formed by the reaction of the amines set forth hereinabove with such pharmacologically acceptable non-toxic acids as hydrochloric acid, hydrobromic acid, ascorbic acid, glutamic acid, lactic acid, tartaric acid, maleic acid, phosphoric acid, benzoic acid, and the like.

The compounds represented by the above formula are useful as antiarrhythmic agents and can be used to overcome or prevent the development of cardiac irregularities.

The amine bases of this invention, the 5-hydroxy-5-aminomethyl dibenzocycloheptene compounds, are readily extracted from the reaction mixture in which they are prepared and are isolated as high boiling oily substances which crystallize readily in the form of acid addition salts. The acid addition salts of these amines are readily formed by mixing the base with a stoichiometrically equivalent quantity of the selected acid in a low boiling solvent such as ethanol or ethyl ether or mixtures thereof. The acid addition salts which are formed in this manner readily precipitate from solution as white, crystalline solids.

The active compounds useful in the method of the present invention are prepared in accordance with the process set forth in the following flow sheet:

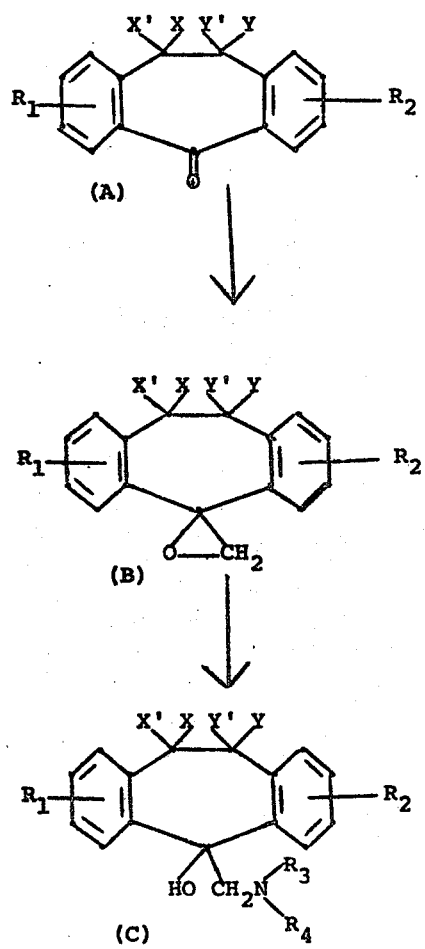

wherein X, X', Y, Y', $R_1$, $R_2$, $R_3$ and $R_4$ are the same as defined hereinabove in the structural formula representing the compounds of the present invention.

The compounds set forth in the above flow sheet which have antiarrhythmic activity and thus prevent the development of cardiac irregularities are the compounds represented by formula (C) hereinabove, that is, the 5-hydroxy-5-aminomethyl-5H-dibenzo[a,d]cycloheptene, the 5-hydroxy-5-aminomethyl-10,11-dihydro-5H-dibenzo[a,d]-cycloheptene, the 4-hydroxy-2,3,5,6-dibenzobicyclo[5.1.0]-octan-4-methylamine, the N-alkyl or the N,N-dialkyl derivatives thereof, as well as the non-toxic pharmacologically acceptable acid addition salts thereof.

In accordance with the process for the preparation of the active compounds, the starting ketones, which are known from the published scientific and patent literature to be intermediates in the preparation of certain tranquillizing and antidepressant compounds, are treated in an inert reaction solvent with a molar excess of dimethylsulfonium methylide or dimethylsulfoxonium methylide under anhydrous conditions to produce as a first intermediate a compound in which the 5-keto substituent is replaced by a 5,2'-epoxide substituent otherwise known as a spiroepoxide compound. The dimethylsulfoxonium methylide is prepared directly before the reaction by treatment of trimethylsulfoxonium iodide with dry sodium hydroxide in a solution of dimethylsulfoxide. During the period of preparation of the dimethylsulfoxonium methylide, vigorous gas evolution occurs and the reaction may be considered to be essentially complete when gas evolution ceases, for a period of from about 5 minutes to approximately 1 hour. Following the evolution of gases, the solution is stirred for an additional 10 minutes to 2 hours in order to ensure completion of the reaction.

To the solution of dimethylsulfoxonium methylide is then added the selected starting material, i.e., the 5H-dibenzo[a,d]cyclohepten-5-one or the 10,11-dihydro-5H-dibenzo[a,d]cyclohepten-5-one, dissolved in a solution of dimethylsulfoxide or any other inert liquid diluent, such as tetrahydrofuran, whereupon the desired spiroepoxide compound forms rapidly. In order to ensure completion of reaction, the reaction mixture is stirred following the addition of the dibenzocycloheptenone compound at a temperature of from 0°-75°C, for a period of from 1-24 hours. The product spiroepoxide compound which is formed is then extracted from the reaction mixture in the following manner: The entire reaction mixture is poured into a large excess of water in order to dilute the mixture. The product is then extracted from the diluted reaction mixture with ether. The product is obtained in substantially pure form as a pale yellow oil after removal of the ether by evaporation under reduced pressure.

The spiroepoxide is converted to the desired 5-hydroxy-5-aminomethyl compound in the following manner: A solution of the spiroepoxide, as for example, spiro-(3-chloro-5H-dibenzo[a,d]cyclohepten-5,2'-epoxide), was heated in the presence of ammonia or a lower alkyl amine for a period of from 1 to 48 hours under superatmospheric pressure. The reaction is preferably conducted in the presence of a small amount of a lower aliphatic alcohol such as methanol and a large excess of ammonia or the selected lower alkyl amine at a temperature of between about 80°-150°C. for a period of from 12-30 hours. Following the reaction, the amine reaction mixture is diluted with a low boiling solvent for the amine such as a lower alkyl ether, the solution of amine washed with water and further purified by extraction into aqueous acid, neutralization with strong base, and re-extraction with ether. The product, 5-hydroxy-5-aminomethyl-5H-dibenzo[a,d]-cycloheptene compound, is then converted preferably to an acid addition salt which crystallizes readily from the ether solution thereof.

Among the compounds useful in the method of the present invention are 5H-dibenzo[a,d]cycloheptene or 10,11-dihydro-5H-dibenzo[a,d]cycloheptene compounds which contain lower alkyl substituents, e.g., methyl, ethyl, propyl, isopropyl, butyl, amyl, and hexyl, halogen substituents, especially chlorine, bromine and fluorine, trifluoromethyl substituents, lower alkoxy substituents, as, for example, methoxy, ethoxy, propoxy, isopropoxy, butoxy, and loweralkylsulfonyl substituents such as methyl or dimethylsulfonyl, ethyl or diethylsulfonyl substituents at one or more of positions 1, 2, 3, 4, 6, 7, 8 and/or 9 of the dibenzocycloheptene molecule. Typical examples of such compounds include N-methyl-(3-chloro-5-hydroxy-5H-dibenzo[a,d]cyclohepten-5)-methylamine, N-methyl-(5-hydroxy-5H-dibenzo[a,d]cyclohepten-5)-methylamine, N-methyl-(3-trifluoromethyl-5-hydroxy-5H-dibenzo[a,d]cyclohepten-5)-methylamine, N-methyl-(3,6-dichloro-5-hydroxy-5H-dibenzo[a,d]cyclohepten-5)-methylamine, N-methyl-(2-methoxy-5-hydroxy-5H-dibenzo[a,d]cyclohepten-5)-methylamine, N-methyl-(3-methylsulfonyl-5-hydroxy-5H-dibenzo[a,d]cyclohepten-5)-methylamine, the corresponding N,N-dimethyl methylamine compounds, the corresponding N-ethyl methylamine compounds, (the corresponding N-propyl, N-butyl methylamine compounds), as well as the corresponding 10,11-dihydro-5H-dibenzo[a,d]-cyclohepten-5)-methylamine compounds. Also included within the scope of the present invention are the above-mentioned acid addition salts of 5-hydroxydibenzocyclohepten methylamine compounds.

The compounds are prepared by the above-described method using the correspondingly substituted ketones listed as follows:

3-chloro-5H-dibenzo[a,d]cyclohepten-5-one
5H-dibenzo[a,d]cyclohepten-5-one
3-trifluoromethyl-5H-dibenzo[a,d]cyclohepten-5-one
3,6-dichloro-5H-dibenzo[a,d]cyclohepten-5-one
2-methoxy-5H-dibenzo[a,d]cyclohepten-5-one
3-methylsulfonyl-5H-dibenzo[a,d]cyclohepten-5-one
10,11-dihydro-3-chloro-5H-dibenzo[a,d]cyclohepten-5-one
10,11-dihydro-5H-dibenzo[a,d]cyclohepten-5-one
10,11-dihydro-3-trifluoromethyl-5H-dibenzo[a,d]cyclohepten-5-one
10,11-dihydro-3,6-dichloro-5H-dibenzo[a,d]cyclohepten-5-one
10,11-dihydro-2-methoxy-5H-dibenzo[a,d]cyclohepten-5-one
10,11-dihydro-3-methylsulfonyl-5H-dibenzo[a,d]cyclohepten-5-one
2,3,5,6-dibenzobicyclo[5.1.0]octan-4-one The above list of examples of compounds useful as the active component of the compositions used in the method of treatment or prevention of arrhythmia includes the class of compounds which are especially preferred for both long-term and short-term administration. This especially preferred class of compounds are 5-(aminomethyl)-5-hydroxy-5H-dibenzo[a,d]cycloheptene, 5-(aminomethyl)-5-hydroxy-10,11-dihydro-5H-dibenzo[a,d]cycloheptene and the corresponding N-loweralkylaminomethyl and the N,N-diloweralkylamino derivatives, particularly 5-hydroxy-5-(methylaminomethyl)-5H-dibenzo[a,d]cycloheptene, 5-hydroxy-5-(dimethylaminomethyl)-5H-dibenzo[a,d]cycloheptene, 10,11-dihydro-5-hydroxy-5-(methylaminomethyl)-5H-dibenzo[a,d]cycloheptene and 10,11-dihydro-5-hydroxy-5-(dimethylaminomethyl)-5H-dibenzo[a,d]cycloheptene.

The condition of arrhythmia is a change in the normal rhythm of the heart which is noted in the higher forms of life, particularly the larger mammals, including dogs, horses, cattle and man. This disturbance in the normal rhythm of the heart of the affected animal may arise spontaneously without apparent cause or it may result from a serious heart condition. Depending on the type of arrhythmia present in the affected patient, it may vary from a momentary effect which will spontaneously be corrected, or in extremely acute cases may result in almost instantaneous death. It is therefore desirable to provide a method of treatment for acute episodes of arrhythmia in the affected patient, or, alternatively, to provide a method of prophylaxis involving the administration of an agent useful in preventing arrhythmias to patients prone to such disturbances of normal heart rhythm.

One of the principal methods of treating arrhythmia using drug therapy in the past has been the administration of quinidine or procaine amide. This method suffers from toxic side effects associated with the drugs which often occur concurrently with the administration of the drug. Particularly important are gastrointestinal disturbances caused by the drugs as well as the possibility of vascular collapse. One difficulty with the administration of these prior art drugs is that the toxic side effects occur at a dosage level recommended for effective control of the arrhythmia.

It has now been found in accordance with the present invention that administration of the compounds of the present invention depicted in the above formulae results in the prevention of arrhythmia in animals under conditions which ordinarily cause the development of arrhythmia in the animal 100 percent of the time. It has further been found that administration of the compounds of the present invention will arrest an existing arrhythmia in the animal being treated and cause a resumption of normal cardiac rhythm.

The daily doses are based on the total body weight of the test animal and vary between about 1.0 and 100.0 mg./kg. for mature animals. Thus, a unit dose based on four-times-a-day administration is between 2.5 mg. and 250 mg. for a 10 kg. dog, and a total daily dose for a 10 kg. dog would vary between about 10 mg. and 1000 mg. For larger animals up to 100 kg. and above, proportional dosages are employed, based on the weight of the animal. Suitable dosage units provided for the administration of the compositions used in the method of the invention are tablets, capsules (which may be suitably formulated for either immediate or sustained release), syrups, elixirs, parenteral solutions, and the like. These dosage forms preferably contain per unit one or more multiples of the desired dosage unit in combination with the pharmaceutically acceptable diluent or carrier required for preparing the dosage unit.

There is some variation in potency between the active compounds employed in the method of this invention and it is preferred to employ compounds which exhibit an effect in test animals at doses of from about 0.1 mg./kg. to 1000 mg./kg. of body weight. Tests are run in experimental animals to determine the relative potency of the antiarrhythmic agent employed in the method of this invention. These tests determine the ability of the selected compound to prevent the occurrence of arrhythmia or to modify an arrhythmia already existing in the test animal.

Although the pharmaceutical compositions of the present invention will ordinarily be administered within the ranges indicated, it is necessary for the skilled practitioner to determine the exact dosage based on variables encountered in treating individual subjects. These variables include the age, sex, general health, and various other factors and, in part, will all affect the determination of the exact amount of active ingredient to be administered as well as the route of administration.

The new compounds of this invention are obtained as a mixture of isomers or as independent isomers. The isomers which are isolated in their pure form may differ from each other in their biological activity.

The following examples are presented as an illustration of the method of this invention, as well as an illustration of the method of preparing the compositions employed in the method of the invention and the active components of such compositions. The examples also provide a method for testing the compositions useful in this method to determine the relative potency of the active ingredient of the composition of the present invention.

EXAMPLE 1

A.

SPIRO-(3-CHLORO-5H-DIBENZO[a,d]CYCLOHEPTEN-5,2'-EPOXIDE

Into a reaction vessel is placed 1.2 gm. of dry sodium hydride. To the dry sodium hydride is added 11.00 gm. (0.05 mole) of trimethylsulfoxonium iodide, and while stirring gently, 35 ml. of dry dimethylsulfoxide is added dropwise over 15 minutes. Vigorous gas evolution occurs and, after all the dimethylsulfoxide is added, the milky solution is stirred an additional 20 minutes.

A solution of 3-chloro-5H-dibenzo[a,d]cyclohepten-5-one (4.00 g., 0.0166 mole) in 75 ml. of dry dimethylsulfoxide is added dropwise over 15 minutes to the solution of dimethylsulfoxonium methylide. The solution, which becomes light red and clear, is stirred at room temperature for 18 hours and then in a water bath at 50°–55°C. for 1 hour.

The solution is poured onto 600 ml. of water and this mixture is extracted with three 200 ml. and four 100 ml. portions of ether. The combined ether extracts are washed with five 200 ml. portions of water and then dried over potassium carbonate. Filtration and evaporation of the ether in vacuo gives a clear, pale yellow oil that shows no carbonyl absorption in the infrared spectrum. Vapor phase chromatography shows the presence of two components (isomers) in a 36/64 ratio. A sample is dried for 16.5 hours at room temperature and 0.1 mm. for analysis.

Analysis calcd. for $C_{16}H_{11}OCl$: C, 75.45; H, 4.35; Cl, 13.92.

Found: C, 75.15; H, 4.67; Cl, 13.58.

B. N-METHYL-(3-CHLORO-5-HYDROXY-5H-DIBENZO[a,d]CYCLOHEPTEN-5)-METHYLAMINE

A mixture of 2.20 g. (0.00865 mole) of spiro-(3-chloro-5H-dibenzo[a,d]cyclohepten-5,2'-epoxide), 35 g. of anhydrous methylamine, and 15 drops of absolute methanol is heated at 120°C. for 24 hours in a steel bomb. The material is transferred to a separatory funnel and diluted with approximately 50 ml. of ether. This ether solution is washed with 3–25 ml. portions of water, and then extracted with 3–20 ml. portions of 0.5N citric acid. The combined citric acid extracts are washed with benzene (25 ml.) and then with ether (25 ml.). The clear citric acid phase is rendered basic by addition of 10N sodium hydroxide, and the oil that precipitates is extracted into three 30 ml. portions of ether. These ether extracts are combined, dried over magnesium sulfate, filtered, and the ether is removed to give a clear oil. This oil is dissolved in 12 ml. of absolute ethanol and treated with 0.175 g. of maleic acid. Ether (115 ml.) is added and crystallization begins. After cooling, there are obtained white needles, m.p. 161°–162.5°C. Recrystallization from an absolute ethanol-ether mixture gives material, m.p. 163°–165°C. (corrected). The material is dried at 80°C. at 0.1 mm. for 16 hours for analysis.

Analysis Calcd. for $C_{17}H_{16}ClNO \cdot C_4H_4O_4$: C, 62.76; H, 5.09; Cl, 8.82.

Found: C, 62.56; H, 5.19; Cl, 8.99.

EXAMPLE 2

N-METHYL-(4-HYDROXY-2,3,5,6-DIBENZOBICYCLO[5.1.0]-OCTAN-4)-METHYLAMINE

Following the above procedure and using 2,3,5,6-dibenzobicyclo[5.1.0]octan-4-one, the product obtained is N-methyl-(4-hydroxy-2,3,5,6-dibenzobicyclo[5.1.0]octan-4)-methylamine which is isolated as the hydrochloride, m.p. 251°–252°C.

EXAMPLE 3

Following the procedure of Example 1, the indicated products are obtained from the starting materials listed below:

| STARTING MATERIAL | PRODUCT |
| --- | --- |
| 3-Chloro-5H-dibenzo[a,d]-cyclohepten-5-one | N-Methyl-(3-chloro-5-hydroxy-5H-dibenzo[a,d]cyclohepten-5)-methylamine |
| 5H-Dibenzo[a,d]cyclohepten-5-one | N-Methyl-(5-hydroxy-5H-dibenzo[a,d]cyclohepten-5)-methylamine |
| 3-Trifluoromethyl-5H-dibenzo-[a,d]cyclohepten-5-one | N-Methyl-(3-trifluoromethyl-5-hydroxy-5H-dibenzo[a,d]-cyclohepten-5)-methylamine |
| 3,6-Dichloro-5H-dibenzo-[a,d]cyclohepten-5-one | N-Methyl-(3,6-dichloro-5-hydroxy-5H-dibenzo[a,d]-cyclohepten-s)-methylamine |
| 2-methoxy-5H-dibenzo[a,d]cyclohepten-5-one | N-Methyl-(2-methoxy-5-hydroxy-5H-dibenzo[a,d]cyclohepten-5)-methylamine |
| 3-Methylsulfonyl-5H-dibenzo-[a,d]cyclohepten-5-one | N-Methyl-(3-methylsulfonyl-5-hydroxy-5H-dibenzo[a,d]cyclohepten-5)-methylamine |

— Continued

| STARTING MATERIAL | PRODUCT |
| --- | --- |
| 10,11-Dihydro-3-chloro-5H-dibenzo[a,d]cyclohepten-5-one | N-Methyl-(10,11-dihydro-3-chloro-5-hydroxy-5H-dibenzo[a,d]cyclohepten-5)-methylamine |
| 10,11-Dihydro-5H-dibenzo-[a,d]cyclohepten-5-one | N-Methyl-(10,11-dihydro-5-hydroxy-5H-dibenzo[a,d]-cyclohepten-5)-methylamine |
| 10,11-Dihydro-3-trifluoromethyl-5H-dibenzo[a,d]cyclohepten-5-one | N-Methyl-(10,11-dihydro-3-trifluoromethyl-5-hydroxy-5H-dibenzo[a,d]cyclohepten-5)-methylamine |
| 10,11-Dihydro-3,6-dichloro-5H-dibenzo[a,d]-cyclohepten-5-one | N-Methyl-(10,11-dihydro-3,6-dichloro-5-hydroxy-5H-dibenzo[a,d]cyclohepten-5)-methylamine |
| 10,11-Dihydro-2-methoxy-5H-dibenzo[a,d]cyclohepten-5-one | N-Methyl-(10,11-dihydro-2-methoxy-5-hydroxy-5H-dibenzo-[a,d]cyclohepten-5)-methylamine |
| 10,11-Dihydro-3-methylsulfonyl-5H-dibenzo[a,d]-cyclohepten-5-one | N-Methyl-(10,11-dihydro-3-methylsulfonyl-5-hydroxy-5H-dibenzo[a,d]cyclohepten-5)-methylamine |

EXAMPLE 4

PREVENTION OR MODIFICATION OF VENTRICULAR ARRHYTHMIA

Beagle dogs of either sex and weighing from 6 to 10 kg. are anesthetized by the administration of vinbarbital employing a dose of 50 mg./kg. of body weight and the mean arterial pressure and the electrocardiogram (Lead II) are recorded. The animals are artificially respired and the thorax opened at the fourth or fifth interspace. The pericardium is opened and a portion of the anterior descending coronary artery just distal to the origin is freed from the surrounding tissue. Mecamylamine is administered to slow the heart rate and 10 minutes later the compound to be tested for antiarrhythmic effect is administered intravenously. Ten minutes after administration of the test compound 0.0035 ml./kg. of tetrafluorohexachlorobutane (TFHCB), a sclerosing agent which produces myocardial infarction and arrhythmia in dogs (Ascanio et al., J. Am. Physiol. 209: 1081–1088 (1965) ) is injected into the coronary artery. In control animals, this dose of TFHCB produces a ventricular arrhythmia in 100% of the animals tested and death in 33% of the animals tested as a result of ventricular fibrillation.

Following injection of the sclerosing agent, an electrocardiogram is recorded at 2 minute intervals for 1 hour and the average number of electrical (ECG) calculated.

The compound 5-(N-methylaminomethyl-5-hydroxy-5H-dibenzo[a,d]cycloheptene is tested at a dose of 5.0 mg./kg. The average percent of normal complexes calculated is 63. Quinidine sulfate, when tested under similar condition at a dose of 5.0 mg./kg. gave average percent of normal values of 46.

EXAMPLE 5

TABLETS

Tablets for oral administration are prepared by mixing the active ingredient with appropriate amounts of excipients and binding agents, formed into tablets by a conventional tableting machine and coated so that each tablet will have the following composition:

| | Per tablet, mg. |
|---|---|
| 5-hydroxy-5-(methylaminomethyl)-5H-dibenzo[a,d]cycloheptene hydrogen maleate | 10.0 |
| Cellulose filter aid | 11.0 |
| Lactose | 9.0 |
| Calcium phosphate dibasic | 143.0 |
| Guar gum | 6.1 |
| Corn starch | 4.0 |
| Magnesium stearate | 0.9 |
| Opaque yellow film coating | 3.0 |

EXAMPLE 6

CAPSULES

Capsules for oral administration are prepared by dispersing the active ingredient in lactose and magnesium stearate and encapsulating the mixture in standard soft gelatin capsules so that each capsule will have the following composition:

| | Per capsule, mg. |
|---|---|
| 5-hydroxy-5-(methylaminomethyl)-10,11-dihydro-5H-dibenzo[a,d]-cycloheptene hydrochloride | 5.0 |
| Lactose | 430.0 |
| Magnesium stearate | 5.0 |

EXAMPLE 7

PARENTERAL SOLUTION

A solution suitable for administration for injection is prepared by mixing the active ingredients, dextrose, methylparaben, propylparaben and distilled water, so that each one will have the following composition, and sterilized:

| | Per ml., mg. |
|---|---|
| 5-hydroxy-5-(dimethylaminomethyl)-5H-dibenzo[a,d]cycloheptene hydrogen maleate | 5.0 |
| Dextrose | 44.0 |
| Methylparaben | 1.5 |
| Propylparaben | 0.2 |
| Water for injection, q.s. | |

The preceding three examples, Examples 5, 6 and 7, are repeated, and compositions for the treatment or prevention of arrhythmia are prepared by substituting any of the compounds specifically illustrated above in place of the dibenzocycloheptene as one of the active compounds useful in the present invention.

What is claimed is:

1. A method for treating cardiac arrhythmia in animals which comprises administering to an afflicted animal an antiarrhythmia dose of an active compound having the formula

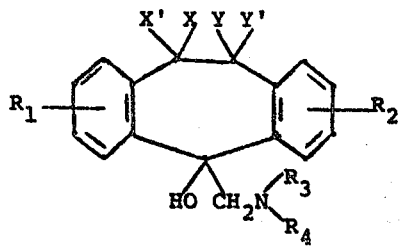

wherein
X and Y together represent
1. an additional carbon-to-carbon double bond, in which case
X' is hydrogen and
Y' represents a substituent selected from the group consisting of hydrogen, chlorine, bromine, fluorine, and a lower alkyl substituent;
2. X and Y together represent a methylene substituent, and
X' and Y' are each hydrogen; and
3. X, X', Y and Y' each represent hydrogen;
$R_1$ and $R_2$ are each a member selected from the group consisting of hydrogen, lower alkyl, chlorine, bromine, fluorine, trifluoromethyl, alkoxy, and a loweralkylsulfonyl; and
$R_3$ and $R_4$ are each a member selected from the group consisting of hydrogen and lower alkyl and the non-toxic pharmacologically acceptable acid addition salts of said compound.

2. A method according to claim 1 wherein the compound administered is a compound of the formula:

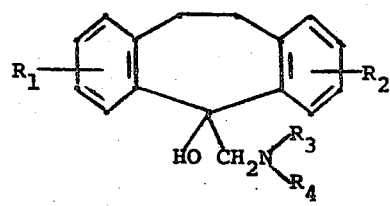

wherein $R_1$, $R_2$, $R_3$ and $R_4$ are as defined in claim 1.

3. A method according to claim 1 wherein the compound administered is a compound of the formula

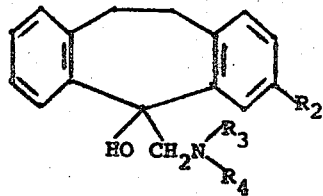

wherein $R_2$, $R_3$ and $R_4$ are as defined in claim 1.

4. A method according to claim 1 wherein the compound administered is a compound of the formula

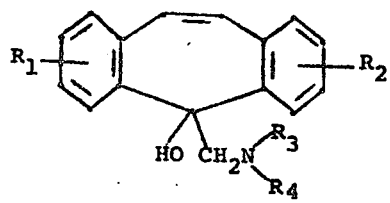

wherein $R_1$, $R_2$, $R_3$ and $R_4$ are as defined in claim 1.

5. A method according to claim 1 wherein the compound administered is a compound of the formula

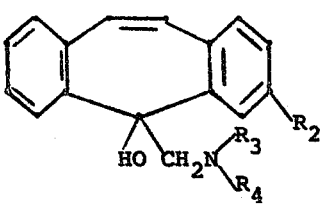

wherein $R_2$, $R_3$ and $R_4$ are as defined in claim 1.

6. A method according to claim 1 wherein the compound administered is N-methyl-(3-chloro-5-hydroxy-5-H-dibenzo[a,d]cyclohepten-5)-methylamine.

7. A method according to claim 1 wherein the compound administered is N-methyl-(10,11-dihydro-5-hydroxy-5H-dibenzo[a,d]cyclohepten-5)-methylamine.

8. A method according to claim 1 wherein the compound administered is N-methyl-(4-hydroxy-2,3,5,6-dibenzobicyclo[5.1.0]-octen-4)-methylamine.

* * * * *